United States Patent
Skourup et al.

(10) Patent No.: US 8,046,719 B2
(45) Date of Patent: Oct. 25, 2011

(54) VIRTUAL WORK PLACE

(75) Inventors: Charlotte Skourup, Drammen (NO); John Pretlove, Sandvika (NO); Trond Loekstad, Nesoddtangen (NO); Torbjørn Engedal, Kristiansand S (NO)

(73) Assignee: ABB Technology Ltd., Zürich (CH)

( * ) Notice: Subject to any disclaimer, the term of this patent is extended or adjusted under 35 U.S.C. 154(b) by 728 days.

(21) Appl. No.: 11/806,208

(22) Filed: May 30, 2007

(65) Prior Publication Data

US 2008/0005702 A1    Jan. 3, 2008

(30) Foreign Application Priority Data

May 31, 2006 (SE) .................................. 0601216

(51) Int. Cl.
G06F 3/00 (2006.01)
(52) U.S. Cl. ......... 715/848; 715/863; 715/757; 715/850
(58) Field of Classification Search .................. 715/848, 715/850, 853, 863, 755, 757, 782
See application file for complete search history.

(56) References Cited

U.S. PATENT DOCUMENTS

| | | | |
|---|---|---|---|
| 6,317,127 B1 * | 11/2001 | Daily et al. | 345/629 |
| 6,445,364 B2 * | 9/2002 | Zwern | 345/8 |
| 6,826,532 B1 | 11/2004 | Casby et al. | |
| 7,512,902 B2 * | 3/2009 | Robertson et al. | 715/848 |
| 2004/0080548 A1 * | 4/2004 | Daily et al. | 345/850 |
| 2006/0284792 A1 * | 12/2006 | Foxlin | 345/8 |
| 2007/0038960 A1 * | 2/2007 | Rekimoto | 715/848 |

FOREIGN PATENT DOCUMENTS
WO  WO-2005/066744 A1  7/2005

* cited by examiner

*Primary Examiner* — Dennis Bonshock
(74) *Attorney, Agent, or Firm* — Venable LLP; Eric J. Franklin

(57) ABSTRACT

The present invention is concerned with a method and computer-based system for configuring, monitoring and/or operating a graphical user interface in two or three dimensions. In particular it is concerned with a graphical user interface used for controlling, monitoring and/or operating equipment in a control system of an industrial process or an installation for oil and gas or for an installation for electrical power generating, transmission and/or distribution.

22 Claims, 2 Drawing Sheets

VIRTUAL WORK PLACE

CROSS-REFERENCE TO RELATED APPLICATIONS

This application claims priority to Swedish patent application 0601216-5 filed 31 May 2006.

TECHNICAL FIELD

The present invention is concerned with a method and a computer-based system for configuring, monitoring and/or operating a plurality of graphical user interfaces in two or three dimensions. In particular it is concerned with a graphical user interface used for controlling, monitoring and/or operating equipment in a control system of an industrial process or an installation for oil and gas or for an installation for electrical power generating, transmission and/or distribution.

BACKGROUND ART

Working 8 hours per day, 5 days per week in front of a computer screen is challenging both physically and mentally. Physically, it is uncomfortable and hard to sit still all day in almost the same position and stare at a computer screen. As a consequence, many people have strain and muscle problems in necks, shoulders and arms. When all work has to take place on a relatively small computer screen, for instance, in control rooms, the limited space is demanding when working with relatively many applications represented by functional interfaces on the computer screen/display. The applications the operators need information about are both, for instance, an overview of the process and detailed information of the current state for specific sub-processes. Examples of additional information represented by functional interfaces such as Microsoft Word windows or views are tables of data and information, trends, maintenance and repair information, reports, ordering systems and working permissions. These functional interfaces are basically provided by two-dimensional (2D) information presentations. All functional interfaces are layered upon each other in a limited area on the desktop display and the user has to use additional equipment, for instance, a mouse or similar, to move functional interfaces around. It is then easy to get lost in the vast sets of functional interfaces spending time to find the right interface.

A further disadvantage is that each user often needs at least one desktop screen in addition to potential projectors as well as large screens, for instance, in control rooms. This is both expensive and space-demanding. When having more desktop screens, the working space is still limited by the physical dimensions of the screens. The fact that each user needs at least one desktop screen in addition to one or more large screens is costly and inefficient.

Augmented Reality (AR) is a method of overlaying real world representations with computer-generated graphics. Ideally, for vision-based augmented reality, the user will not be able to recognize the difference between the real and the computer-generated graphics, and thereby the user will get an improved perception of the real world environment. Today, augmented reality techniques are used in a number of applications. Examples of use are within media, for example weather reporting, medicine, for example visualization of internal organs, for collaborative environments, for example virtual meeting rooms, and in process industries for maintenance, service and repair.

Handheld and wearable control panels with interaction possibilities already exist and the interest in such devices increases.

The use of mobile phones and personal digital assistants (PDAs) as the interface towards systems or devices is known. Also, tablet PCs, which are used, e. g. within hospitals, provide an interface that the user easily carries around and interacts with by touching the screen.

U.S. Pat. No. 6,826,532 B1 discloses a control for an automotive service system including a pair of goggles incorporating a head-up display which displays the data from the system controller by virtual display in the technician's forward field of vision without blocking his general forward field of view.

WO 2005/066744 A1 discloses a system that enables a user to interact with a virtual control panel using a user controlled pointing object. The system comprises a portable identification element, a tracking unit adapted to capture data representing the position of the pointing object and the position of the identification element, a storage unit, storing at least one pre-defined graphical interface representing a control panel of a device, a graphics unit, generating a graphical representation of the control panel, a registering unit, registering said graphical representation of the control panel in a fixed relation to said portable identification element to produce a virtual control panel and a display unit, showing the user a view comprising the real world and the virtual control panel.

There is a desire to find a method to improve the accessibility of and to switch between many possible technical information/control applications on a desktop and to find more compact lightweight equipment to enable a more ergonomic work place as well as enable working personnel to access difficult locations where only one person can go in a plant while having access to technical information and handle control applications.

SUMMARY OF THE INVENTION

The object of embodiments of the invention is to improve a work place as specified above.

In a first aspect of the invention this object is achieved by embodiments of a system according to the invention.

A system comprising a logic unit for managing data in a plurality of applications, a wearable display device, for visually displaying the data received from the logic unit including means for imaging the data into a field of view of the user, whereby the user can receive data from the wearable display. The system further comprises an augmented reality representation of computer-generated graphical information overlaid on the real world, an interactive input device, a tracking system to capture data representing the position of the wearable display device, relative to the interactive input device, and means for displaying an augmented reality representation of a virtual desktop on said wearable display device, comprising a plurality of functional interfaces representing said applications, accessed using said interactive input device, and that said desktop is expanded in space so that the desktop is shaped as a virtual sphere and with the functional interfaces displayed at optional depth in the sphere.

Some embodiments of the invention basically expand the working area for one or several users from regular two-dimensional (2D) displays on screens into a three-dimensional (3D) augmented world virtual desktop. Virtual desktops and virtual functional interfaces are thereby made accessible and placed floating in 3D around the user in the real world. This system does not require any physical computer screens. The functional interfaces are visualised onto, for example, Head-Mounted Displays (HMD). This is an advantage because the user can move the functional interfaces around in space with his hands and otherwise interact with the functional interfaces using keyboard, mouse and joystick.

Advantages with certain embodiments of the present invention:

An increased access to more data sources/control functional displays via 3D virtual desktops, arranged in 3D space, than is possible with a plurality of 2D physical screens.

Rapid and more ergonomically access to many sources of technical or control information is made possible because the virtual desktop is placed in 3D space around the user in the real world.

The working space is expanded by using a larger desktop.

The working environments and modes are completely customisable and therefore easier to access and more ergonomic than a more fixed workplace using 2D physical screens.

Better overview of the processes, which simplifies decision-making which further leads to better efficiency and thereby lower costs.

An increased flexibility and mobility because the equipment is more compact and therefore lightweight.

An augmented reality (AR) system as described above may include at least: A wearable display device, an interactive input device, a computer to control and display the virtual functional interfaces in 3D space, a tracking system for determining position and orientation of the wearable display device relative to the interactive input device, and graphics software for combining graphics of the virtual functional interfaces and captured video images and/or the real world view.

This system is also applicable to other applications than control rooms and offices.

The interacting input device may also comprise an output device for interacting with the functional interfaces.

According to an embodiment of the invention the expansion of said virtual desktop is 360 degrees in three degrees of freedom. As the user can place functional interfaces is 360 degrees in three degrees of freedom around him the desk top space is almost unlimited. This is an advantage because the desktop system is thereby flexible and ergonomically comfortable.

According to an embodiment of the invention the system is adapted to modify the appearance of the virtual desktop in response to interactions between the interactive input device and the virtual desktop. This is an advantage because the desktop system is thereby flexible. This is further an advantage because the operators are able to arrange the position and size of the various information in the different functional interfaces, thereby making it possible to filter, emphasize and customize information and thereby customize the functional interfaces and work place to a current application. The operator can also switch between many possible technical information/control functional displays easier.

According to an embodiment of the invention the interactive input device is used to move, rotate, scale and lock functional interfaces in the 3D space. The working conditions are thereby improved as the user can move a functional interface exactly to that position that fits best at the current time. For instance, the functional interface is placed in space or the functional interface is placed horizontally at a desk. Because the working space is expanded by using a larger desktop, the access to different applications represented as functional interfaces on the display is increased. The operator can switch between many possible technical information/control functional displays easier. In a preferred embodiment of the invention the expansion of said virtual desktop is 360 degrees in three degrees of freedom, and the functional interfaces are moved, rotated, scaled and locked in the 3D space coordinated using Polar or Cartesian coordinates.

According to an embodiment of the invention the interactive input device is used to interact with an application accessible via a functional interface. This is an advantage because the operators are able to select, enter, copy, paste, delete, change, etc. information and data within the application itself. Examples of interaction with the application accessible via a functional interface are to sign off an incoming alarm, to place the cursor within a document to be able to enter additional text, to select a device, for instance, a pump, to view detailed information such as a maintenance record or trends, to set a set-point such as, for instance, a system limit for temperature or pressure, etc.

According to an embodiment of the invention the system is adapted to two or more users working together on one application simultaneously. Because the system only use one physical computer screen/display per user instead of one or more desktop screens, projectors and large screens per user the cost will decrease. Further this will improve the accessibility of technical information/control applications on the desktop.

According to an embodiment of the invention the system comprises a camera to capture a live video stream of the environment corresponding to the user's view of the real world and that the virtual graphics are overlaid on the video of said real world forming said augmented reality representation of a virtual desktop. This is an advantage for instance in a dark environment when infrared light is used and the camera is adapted to use infrared technique, and it is thereby made possible for the operator to virtually see in the dark.

According to an embodiment of the invention the display device are adapted to be optically transparent and the computer-generated graphics are registered directly onto the display device and follows the user's view of the real world so that the computer-generated graphics are overlaid the real world forming the augmented reality representation of a virtual desktop. This is an advantage because it is a simple and user-friendly solution.

According to an embodiment of the invention the wearable display device is any of a list: instance glasses, a head-mounted display, a head-up display, virtual retinal display. In a further an embodiment of the invention the interactive input device is any of a list: keyboard, 2D-mouse, 3D-mouse, joystick, trackball, gesture-based data input, such as data gloves, or means to interact with a pen/fingertip directly on the functional interfaces functioning as a virtual touch screen. This introduces a small light compact piece of equipment for work places. This is an advantage because it is thereby made possible to access difficult locations where only one person can go in a plant. This makes it possible to use new ways of interacting with functional interfaces. This is further introducing a flexible and comfortable desktop system. The interaction with the content presented in the functional interfaces is carried with any of the display devices or interactive input device as mentioned above. The virtual touch screen is more flexible and comfortable for the user. Continuous development of HMD will probably result in more cost-effective HMD in a few years. In this context data gloves means interactive input devices in the form of gloves provided with input means such as sensors intended to interact with a virtual reality system.

In a second aspect of the invention this object is achieved by a graphical user interface.

In a third aspect of the invention this object is achieved by a method.

A method that enables a user to interact with a system comprising a logic unit for managing data in a plurality of applications using a wearable display device, for visually displaying the data received from the a logic unit including means for displaying the data into a field of view of the user, and means for receiving data from the wearable display, wherein the method comprises:

- displaying an augmented reality representation of computer-generated graphical information overlaid on the real world,
- using an interactive input device as a tracking system to capture data representing the position of the wearable display device, relative to the interactive input device
- displaying an augmented reality representation of a virtual desktop on said wearable display device, said virtual desktop comprising applications represented by a plurality of functional interfaces,
- performing actions so that said interactive input device accesses said functional interfaces,
- performing actions so that said desktop is expanded in space so that the desktop is shaped as a virtual sphere and with the functional interfaces displayed at an optional depth in the sphere.

The method and system according to the invention are used to configure and efficiently work with several functional interfaces in 3D space. Typically, a majority of work performed in control rooms, offices and similar concerns interaction with 2D desktop screens. This invention uses augmented reality (AR) to visualise the traditional 2D functional interfaces as either 2D or 3D virtual functional interfaces in the space.

In a fourth aspect of the invention this object is achieved by a computer program directly loadable into the internal memory of a computer, comprising software for performing the steps of a method according to embodiments of the invention and a computer-readable medium, having the program recorded thereon.

Some embodiments of the method are particularly suitable for use in a control system of an industrial process or an installation for oil and gas or for an installation for electrical power generating, transmission and/or distribution.

BRIEF DESCRIPTION OF THE DRAWINGS

The present invention will be described in more detail in connection with the enclosed schematic drawings.

DESCRIPTION OF THE PREFERRED EMBODIMENTS

The system and the method provide a virtual desktop, which adapts its interface and content to a device and/or a system by using augmented reality.

A system for generating an augmented reality representation of computer-generated graphical information overlaid on the real world can be configured in different ways. Two ways of visualizing augmented reality are video see-through and optical see-through. Video see-through needs a camera to capture a live video stream of the environment corresponding to the user's view of the world. The system combines computer-generated graphics with the live video stream and projects the combined augmented reality video onto the display device. The user sees the video with overlaid virtual information as if he was looking at the real world. For optical see-through, the computer-generated graphics are registered directly onto the display device and follows the user's view of the real world. The virtual graphics are overlaid on the real world without including a video of it. The former solution is less demanding regarding the frame rate.

Figure 1:
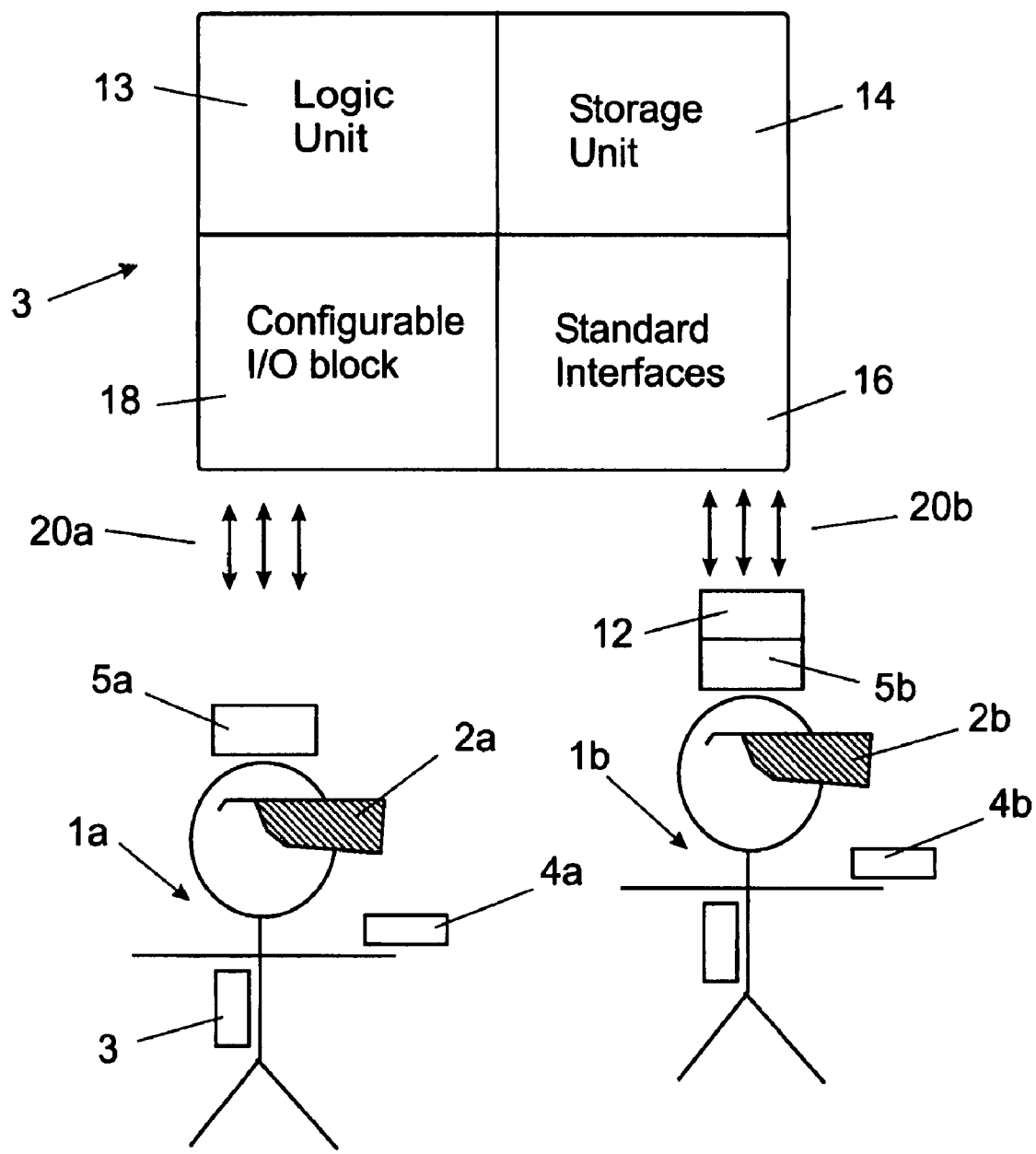
FIG. 1 illustrates an embodiment of a system for configuring and operating a virtual desktop according to the invention.

FIG. 1 illustrates a system comprising an augmented reality representation of computer-generated graphical information overlaid on the real world, for configuring monitoring and/or operating a virtual desktop comprising functional interfaces, for instance, in an industrial system process. A user 1a initiates the system to perform steps for monitoring and/or executing an instruction for a given characteristic represented on a virtual desktop. The augmented reality (AR) system includes a wearable display device 2a, such as a Head Mounted Display (HMD), a tracking system, software and a wearable computer 3, and a handheld interactive input device 4a. The tracking system comprises a tracking unit 5a for determining position and orientation of the operators head in relation to the position of the handheld interactive input device 4a, both in relation to a world coordinate system. The input/output device 4a defines the position and orientation of different objects displayed on the virtual desktop. The wearable display device 2a, visualizes the augmented reality overlaid on the view of the real world. A virtual desktop is an augmented reality view of a real desktop. The virtual desktop is visualized at the wearable display device 2a. The wearable display device 2a is for instance glasses, a head-mounted display a head-up display or a virtual retinal display that are adapted to display the computer-generated graphical information directly on the retina of the operator.

In another embodiment also shown FIG. 1 video see-through is used to generate and present the virtual desktop in relation to the information to and from the input/output device 4b. As described above the tracking unit 5b is placed on the operator's 1b head, for determining position and orientation of the operators head in relation to a the position of the handheld interactive input device 4b, both in relation to a world coordinate system. The input/output device 4b defines the position and orientation of different objects displayed on the virtual desktop. In this embodiment the system further comprises a camera 12 for capturing a stream of images of the environment, i. e. of the real world. The camera 12 is mounted in a fixed position relative to the wearable display device 2b, for example mounted on or integrated with the wearable display device 2b. The wearable display device 2b is located along the view axis of the camera 12 and at the camera's image plane. Thus, the camera 12 is located in relation to the wearable display device 2b in such a way that it provides the same view, as the user would get by looking directly at the real world. The live video stream of images is combined with computer-generated graphics representing the desktop, and the combination of the real world and the graphics is presented in real-time at the wearable display device 2b. Additional functionality includes camera 12 zooming with output of the actual camera focal length. This will enable the system to display the computer-generated graphics correctly while zooming. The camera 12 may also be used for vision-based tracking by the tracking unit 5.

The handheld interactive input device 4a, 4b can also be a touch-screen. Advantageously user input may also be voice-generated or hand-motion generated.

The FIG. 1 also illustrates the wearable computer 3 more in detail. The wearable computer 3 comprises a logic unit 13, necessary software in order to generate one or a plurality of virtual desktops based upon the output from the tracking unit 5a, 5b, and/or a video stream from the camera 12 depending on if a camera 12 is used or not.

The wearable computer 3 also contains the necessary software needed to perform the desired task or process, e. g. two-way communication with devices, real-time data managing and visualization. Further, the wearable computer 3 will generate the graphics, which will provide the augmented reality interface view. Further, the wearable computer 3 may contain a storage unit 14 in order to save, and restore previously saved, information for example predefined graphical interfaces to devices. The wearable computer 3 also comprises a standard interface 16, and a configurable hardware I/O interface (input/output interface) 18. The standard interfaces 16 comprise, for instance, any data interface to the logic unit 13, such as a serial interface. The configurable hardware I/O interfaces 18 accept input signal into the wearable display device 2a, 2b and/or send an output signal out from the wearable display device 2a, 2b, as indicated by arrows 20a, 20b in the figure. In another embodiment a stationary computer, or a server/client solution, could be used instead of the wearable computer.

Communication of information between the wearable computer 3 and the camera 12, tracking unit 5a, 5b, and the wearable display device 2a, 2b is performed through a wired or wireless link. Depending on the type of tracking unit, the pose of the interactive input device 4a, 4b can come from the interactive input device 4a, 4b itself, or from an external tracking unit.

The user 1a, 1b holds the interactive input device 4a, 4b in his hand or wears it on his body, e. g. around his wrist. The user also wears the wearable display device 2a, 2b and the wearable computer 3, in the embodiment with the wearable computer 3. The user may walk around in the environment carrying the virtual desktop.

Figure 2:
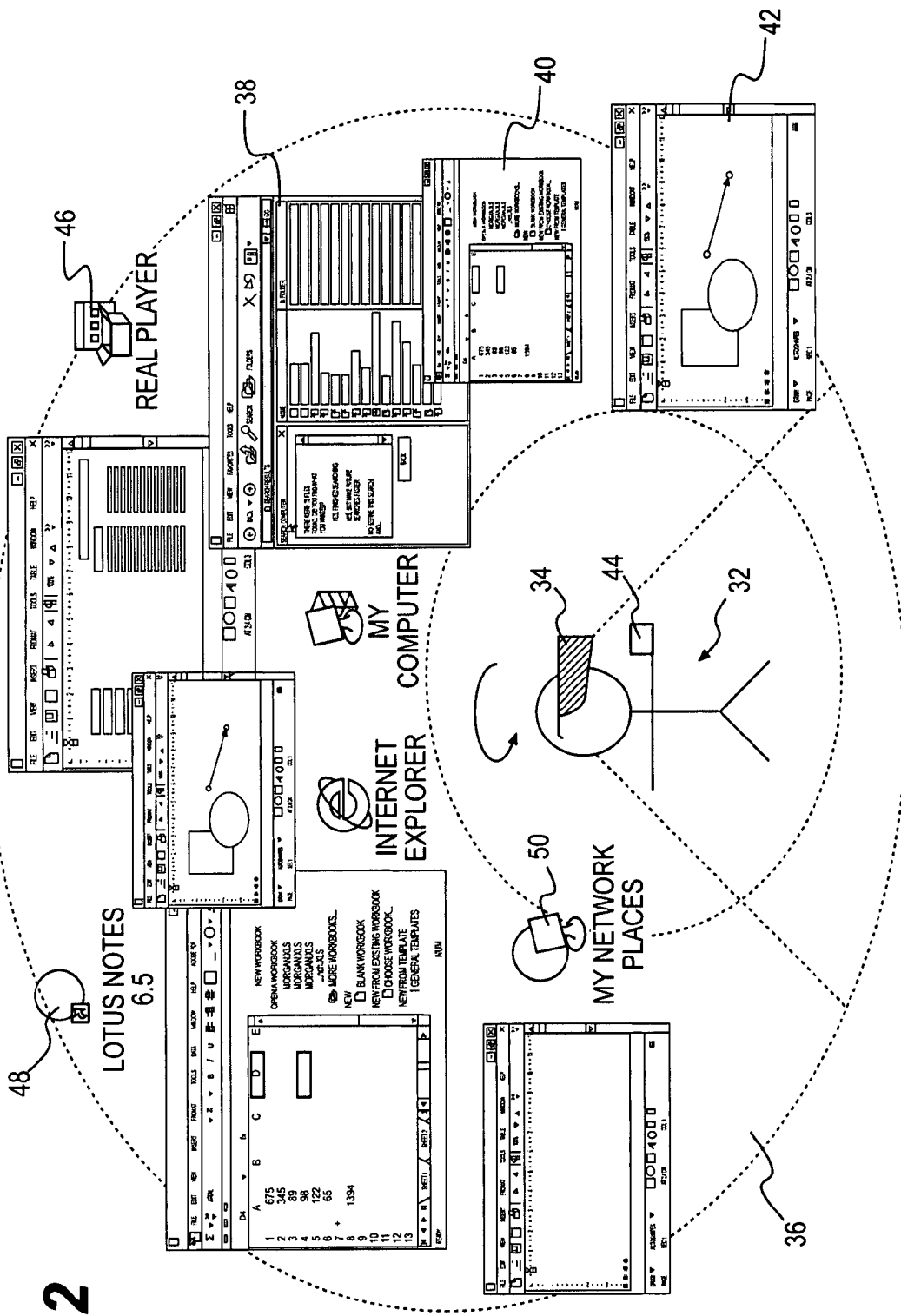
FIG. 2 illustrates a simplified representation of an embodiment of a virtual desktop according to the invention.

The FIG. 2 illustrates the method and system for configure and efficiently work with several functional interfaces in 3D space.

The FIG. 2 illustrates an operator 32 wearing a wearable display device 2a, 2b, such as a head-mounted display (HMD) 34, surrounded with a virtual desktop 36 for configuring monitoring and/or operating the virtual desktop, for instance, in an industrial system process. The augmented reality (AR) system visualises the traditional 2D functional interfaces as either 2D or 3D virtual functional interfaces 38, 40, 42 in the space. The functional interfaces 38, 40, 42 are visualised onto the wearable display device 2. For instance, the user 32 manipulates the virtual desktop and moves a functional interface 38, 40, 42 around in space with his hands, using a handheld interactive input device 44, or otherwise interacts with the functional interfaces using keyboard, mouse and joystick, or other future input device.

The user 32 moves the functional interfaces 38, 40, 42 around in space to the position that is most appropriate for each functional interface related to a specific task. The user moves a functional interface to a desired position relative to the 3D space, identified using Polar coordinates, Cartesian coordinates or the like. When the user turns his head, he sees functional interfaces at the various positions he has previously selected. Some functional interfaces may appear only as an icon 46, 48, 50 if, for example, they are rarely used. This solution provides the user 32 with an unlimited space for working with functional interfaces 38, 40, 42, 46, 48, 50 and increases flexibility.

The augmented reality system projects virtual information representing functional interfaces onto the real world. The user 32 will then see the real world and, while he moves around, virtual functional interfaces around him. The tracking system traces his movements and position relatively to the world.

The operator 32 now has the opportunity to open up functional interfaces 38, 40, 42, 46, 48, 50 as with a regular computer. The functional interfaces can then be moved, rotated and scaled in 3D space. This means that he can have a virtual functional interface with an overview of the process on his left and e.g. a Microsoft Word window on his right. Virtual desktops 36 and virtual functional interfaces 38, 40, 42, 46, 48, 50 are accessible and floating in 3D around the user 32 in the real world. The user 32 is able to move, rotate, scale and lock functional interfaces in the 3D space, using Polar coordinates, Cartesian coordinates or the like. A locked functional interface then has constants as coordinates so that the functional interface is placed fixed in the 3D space. That way the user 32 is able to arrange the position and size of the various information, making it possible to filter, emphasize and customize information, zoom in and zoom out functional interfaces 38, 40, 42, 46, 48, 50, fly through a virtual or augmented reality model, look at a video or real time video images from a location in a plant, look at process control displays for the control system, manipulate the displays with eye movements etc. The displayed space provided according to the invention is almost unlimited as the user can place functional interfaces is 360 degrees in three degrees of freedom around him. The working conditions will be improved as the user 32 can move a functional interface 38, 40, 42, 46, 48, 50 exactly to that position that fits best at the current time. This can also be to place the functional interface horizontally at a desk. The interactive input device is further used to interact with an application accessible via a functional interface. This is an advantage because the operators are able to select, enter, copy, paste, delete, change, etc. information and data within the application itself.

The interaction with the content presented in the functional interfaces 38, 40, 42, 46, 48, 50 is carried out using the interactive input device, for instance, a keyboard, a mouse, a joystick, a trackball, or a 3D mouse, or the user may be able to interact with a pen/fingertip directly on the functional interfaces functioning as a virtual touch screen, for instance, using gesture-based data input, such as data gloves. This solution allows flexibility and comfort for the user.

In a further embodiment the virtual desktop display or parts of the virtual desktop display are manipulated using a control panel, eye movements, or voice commands.

Further, this provides the user with a single computer screen or display that allows him/her to see all functional interfaces. A single display/computer screen for each user allows all users to work in a much larger space and to share functional interfaces with each other.

In another embodiment of the method and the system also shown in FIG. 1, as a substitute for, or in addition to, a large external screen, two or more users 1a, 1b may share their views with each other. Hence, it is made possible for the users to interact with one or more selected functional interfaces at the same time. Two or more users 1a, 1b work together on an application, they can share a functional interface, or more functional interfaces, and work on the same virtual 2D/3D desktop.

The described system form a complete system that can run both autonomously and/or is connected to a higher level control system, for a technical system for instance, a production cell or other production processes in a facility. The system is capable of interconnection with a very large variety of other components/systems due to the configuration of each channel of the hardware interface as either input or output, which may be digital or analogue and for compatibility with various bus and/or field-bus standards.

The augmented reality system is applicable to a control system of an industrial process or an installation, for instance, an industrial process or an installation for oil and gas or to an installation for electrical power generating, transmission and/or distribution. It will be understood by those skilled in the art that various modifications and changes may be made to the present invention without departure from the scope thereof, which is defined by the appended claims. For instance, a user can select visual information from a number of data sources.

In particular the augmented reality system is applicable in automated technology processes and in control rooms and control room design. The augmented reality system is also advantageously used in control room in addition to "Helpdesk" situations, remote support, office work etc.

In another embodiment the described system can be used in a facility or an office where the operator does not have a fixed located work place but instead moves around.

In a physical implementation of the invention the operator uses, for instance: a tablet personal computer (tablet PC), a wearable computer and, for instance, wireless access to information via General Packet Radio Service (GPRS), WLAN, Bluetooth or other.

In this context a tablet personal computer PC is a handheld personal computer where the display/screen is approximately the same size as the entire device. The screen is touch-sensitive and therefore, the tablet PC has no traditional keyboard. Tablet PCs are, for example used within hospitals for registering information about the patients, to have access to medical databases, etc. Further the tablet PC may comprise an integrated camera. In this case the camera has the same view as if the operator looks directly through the display. This makes it possible to show an interface on the screen as if it the screen was transparent, when moving the tablet PC around. Using the video see-through technology, it is made possible to present augmented reality on the tablet PC. The same solution is applicable with, for example, PDAs (personal digital assistants) and mobile phones.

The logic unit or computing unit comprises a microprocessor, or processors comprising a central processing unit, CPU, or a field-programmable gate array (FPGA) or any semiconductor device containing programmable logic components and programmable interconnects performing the steps of the method according to an aspect of the invention. This is performed with the aid of one or more computer programs, which are stored at least in part in memory accessible by the processor. It is to be understood that the computer programs may also be run on one or more general-purpose industrial microprocessors or computers instead of a specially adapted computer.

The computer program comprises computer program code elements or software code portions that make the computer perform the method using equations, algorithms, data and calculations previously described. A part of the program may be stored in a processor as above, but also in an ROM, RAM, PROM, EPROM or EEPROM chip or similar memory means. The program in part or in whole may also be stored on, or in, another suitable computer-readable medium such as a magnetic disc, CD-ROM or DVD disk, hard disk, magneto-optical disk, CD-ROM or DVD disk, hard disk, magneto-optical memory storage means, in volatile memory, in flash memory, as firmware, or stored on a data server. Removable memory media such as removable hard drives, bubble memory devices, flash memory devices and commercially available proprietary removable media such as the Sony memory stick and memory cards for digital cameras, video cameras and the like may also be used. The computer programs described may also be arranged in part as a distributed application capable of running on several computers or computer systems at more or less the same time.

Wireless communications may be carried out using a wireless protocol capable of providing reliable transmissions in an industrial environment including standards or any suitable protocol such as Ericsson's Bluetooth, Wireless Local Area Network (WLAN). Short range radio communication is the preferred technology, using a protocol compatible with, standards issued by the Bluetooth Special Interest Group (SIG), any variation of IEEE-802.11, WiFi, Ultra Wide Band (UWB), ZigBee or IEEE-802.15.4, IEEE-802.13 or equivalent or similar. More generally a radio technology working in the ISM band with significant interference suppression means by spread spectrum technology is preferred. Wireless communication may also be carried out using Infra Red (IR) means and protocols such as IrDA, IrCOMM or similar. Wireless communication may also be carried out using sound or ultrasound transducers, through the air or via work object construction, pure magnetic or electric fields (capacitive or inductive communication) or other types of light, such as for example LED, laser, as communication media with standard or proprietary protocols. For the communication, there may be further requirements imposed by the fieldbus or other parts of the control system. For example, there may be a requirement in respect of defining maximum permissible latency, e.g. the time from an I/O changes on e.g. a bus means such as Profibus till the actual I/O value changes on the component exterior. The wireless mobile information processing device provides the information preferably adapted for a thin client application, such as a web client or other web browser type of application.

The computer programs described may also be arranged in part as a distributed application capable of running on several different computers or computer systems at more or less the same time.

A computer readable medium, having a program recorded thereon, where the program is to make a computer perform the steps of a method according to an embodiment of the invention, when said program is run on the computer.

A database may also contain information to be used performing the steps of a method according to an embodiment of the invention, for configuring, monitoring and/or operating a virtual desktop, such as a graphical user interface (GUI), in two or three dimensions.

A website may also comprise client/server means to perform a method according to an embodiment of the invention in an industrial facility for configuring, monitoring and/or operating a virtual desktop in two or three dimensions.

A data communication signal may also be used for configuring, monitoring and/or operating a virtual desktop in two or three dimensions in an industrial facility for an industrial process. The data communication signal comprises information for configuring, monitoring and/or operating a virtual desktop in two or three dimensions.

The invention claimed is:

1. A system, comprising:
a logic unit for managing data in a plurality of applications;
a wearable display device for visually displaying the data received from the logic unit whereby a user can receive data from the wearable display;
an augmented reality representation of computer-generated graphical information overlaid on an image of a real world;
an interactive input device;

a tracking system to capture data representing the position of the wearable display device, relative to the interactive input device;

means for displaying an augmented reality representation of a virtual desktop on said wearable display device, the virtual desktop comprising a plurality of functional interfaces representing said applications, wherein the interfaces comprise at least one of technical information and control functions, accessed using said interactive input device, wherein said virtual desktop is arranged expanded in a 3D space so that the virtual desktop is shaped as a virtual sphere surrounding the user and configured to display the functional interfaces at an optional depth in the sphere, such that the interfaces are simultaneously displayed, and wherein the interactive input device is configured to interact with the virtual desktop to manipulate the interfaces in the 3D space, wherein the expansion of said virtual desktop is 360 degrees in three degrees of freedom, and wherein the manipulation of the functional interfaces comprises at least one of navigating among, movement, rotation, scaling, or locking in the 3D space coordinated using polar or Cartesian coordinates, minimizing, zooming in, zooming out, selecting data, entering data, copying data, pasting data, or changing data; and a camera to capture a live video stream of the environment corresponding to a view of the real world of the user, wherein the virtual graphics are overlaid on the video of said real world forming said augmented reality representation of a virtual desktop.

2. The system according to claim 1, wherein the interactive input device is used to navigate among, move, rotate, scale and lock the functional interfaces in the 3D space.

3. The system according to claim 1, wherein the interactive input device is configured to interact with an application accessible via one of the functional interfaces.

4. The system according to claim 1, wherein the system is adapted to two or more users working together on one application simultaneously.

5. The system according to claim 1, wherein the display device is adapted to be optically transparent and the computer-generated graphics are registered directly onto the display device and follows a view of the user of the real world so that the computer-generated graphics are overlaid the real world forming the augmented reality representation of a virtual desktop.

6. The system according to claim 1, wherein the wearable display device comprises at least one of instance glasses, a head-mounted display, a head-up display, or virtual retinal display.

7. The system according to claim 1, wherein the interactive input device comprises at least one of keyboard, 2D-mouse, 3D-mouse, joystick, trackball, data gloves, or means to interact with a pen/fingertip directly on the functional interfaces functioning as a virtual touch screen.

8. The system according to claim 1, wherein two or more users share views with each other.

9. The system according to claim 1, wherein two or more users interact with at least one functional interface simultaneously.

10. The system according to claim 1, wherein two or more users interact with a same virtual desktop.

11. A system comprising a computer including computer program instructions for generating a graphical user interface, a wearable display device for visually displaying the graphical user interface, a tracking system to capture data representing the position of the wearable display device, relative to the interactive input device, a camera to capture real world video of an environment corresponding to a view of a real world of a user, the graphical user interface comprising a virtual desktop comprising a plurality of simultaneously displayed functional interfaces representing applications, wherein the interfaces comprise at least one of technical information and control functions, accessed using an interactive input device, wherein the interactive input device is configured to interact with the virtual desktop to manipulate the interfaces in the 3D space, wherein said virtual desktop is arranged expanded in a 3D space so that the virtual desktop is shaped as a virtual sphere surrounding a user and with the functional interfaces simultaneously displayed at an optional depth in the sphere, wherein the virtual desktop overlaid on the real world video, thereby forming said augmented reality representation of a virtual desktop, and wherein an arrangement of the interfaces in the 3D space is configured to be altered by interactions between the interactive input device and the virtual desktop, wherein the virtual desktop is expandable 360 degrees in three degrees of freedom, and wherein the functional interfaces are manipulatable through at least one of navigating among, movement, rotation, scaling, or locking in the 3D space coordinated using polar or Cartesian coordinates, minimizing, zooming in, zooming out, selecting data, entering data, copying data, pasting data, or changing data.

12. A method that enables a user to interact with a system comprising a logic unit for managing data in a plurality of applications using a wearable display device, for visually displaying the data received from the logic unit including means for displaying the data in a forward field of view of the user, a camera to capture a live video stream of the environment corresponding to a view of the real world of the user, and a receiver configured to receive data from the wearable display device, the method comprising:

displaying an augmented reality representation of computer-generated graphical information overlaid on an image of a real world;

using an interactive input device, a tracking system to capture data representing the position of the wearable display device, relative to the interactive input device;

displaying an augmented reality representation of a virtual desktop on said wearable display device, said virtual desktop comprising applications represented by a plurality of simultaneously displayed functional interfaces comprising at least one of technical information and control functions, wherein the virtual graphics are overlaid on the video of said real world from the camera, thereby forming said augmented reality representation of a virtual desktop;

performing actions so that said interactive input device accesses said functional interfaces, wherein the interactive input device interacts with the virtual desktop to manipulate the interfaces in the 3D space;

performing actions so that said desktop is arranged expanded in a 3D space so that the desktop is shaped as a virtual sphere surrounding the user and with the functional interfaces simultaneously displayed at optional depth in the sphere; and expanding said virtual desktop in 360 degrees in three degrees of freedom, wherein manipulating the interfaces comprises at least one of navigating among, moving the functional interfaces, rotating, scaling or locking the functional interfaces in 3D space using Polar or Cartesian coordinates to determine the locations of the functional interfaces in space, minimizing, zooming in, zooming out, selecting data, entering data, copying data, pasting data, or changing data.

13. The method according to claim 12, further comprising:
modifying the appearance of virtual desktop in response to interactions between the controlled interactive input device and the virtual desktop.

14. The method according to claim 13, wherein manipulating the interfaces comprises using the interactive input device to carry out at least one of navigate among, move, rotate, scale or lock functional interfaces in the 3D space, minimize, zoom in, zoom out, select data, enter data, copy data, paste data, or change data.

15. The method according to claim 13, wherein the interactive input device is used to interact with an application accessible via a functional interface.

16. The method according to claim 12, wherein two or more users are working together on one application simultaneously.

17. The method according to claim 12, further comprising:
using a camera to capture a live video stream of the environment corresponding to the user's view of the real world and that the virtual graphics are overlaid on the video of said real world.

18. The method according to claim 12, further comprising:
using a display device that is adapted to be optically transparent and registering the computer-generated graphics directly onto the display device following a view of the user of the real world so that the computer-generated graphics are overlaid the real world forming.

19. The method according to claim 12, wherein the wearable display device comprises at least one of instance glasses, a head-mounted display, a head-up display, and virtual retinal display.

20. The method according to claim 12, wherein the interactive input device comprises at least one of keyboard, 2D-mouse, 3D-mouse, joystick, trackball, data gloves or means to interact with a pen/fingertip directly on the functional interfaces functioning as a virtual touch screen.

21. The method according to claim 12, further comprising:
controlling a system of an industrial process or an installation for oil and gas or for an installation for electrical power generating, transmission and/or distribution.

22. A computer program product, comprising:
a non-transitory computer readable medium; and
computer program instructions recorded on the computer readable medium and executable by a processor for carrying our a method the method comprising displaying an augmented reality representation of computer-generated graphical information overlaid on an image of a real world, using an interactive input device, a tracking system to capture data representing the position of the wearable display device, relative to the interactive input device, displaying an augmented reality representation of a virtual desktop on said wearable display device, said virtual desktop comprising applications represented by a plurality of simultaneously displayed functional interfaces comprising at least one of technical information and control functions, wherein the virtual graphics are overlaid on the video of said real world from the camera, thereby forming said augmented reality representation of a virtual desktop, performing actions so that said interactive input device accesses said functional interfaces, wherein the interactive input device interacts with the virtual desktop to manipulate the interfaces in the 3D space, performing actions so that said desktop is arranged expanded in a 3D space so that the desktop is shaped as a virtual sphere surrounding the user and with the functional interfaces simultaneously displayed at optional depth in the sphere; and expanding said virtual desktop in 360 degrees in three degrees of freedom, wherein manipulating the interfaces comprises at least one of navigating among, moving the functional interfaces, rotating, scaling or locking the functional interfaces in 3D space using Polar or Cartesian coordinates to determine the locations of the functional interfaces in space, minimizing, zooming in, zooming out, selecting data, entering data, copying data, pasting data, or changing data.

* * * * *